US008862588B1

(12) United States Patent  
Gay et al.

(10) Patent No.: US 8,862,588 B1
(45) Date of Patent: Oct. 14, 2014

(54) GENERATING AN EMPIRICALLY-DETERMINED SCHEMA FOR A SCHEMALESS DATABASE

(75) Inventors: David Edward Gay, Oakland, CA (US); Max C. Ross, Sunnyvale, CA (US); Alfred R. K. Fuller, San Carlos, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/431,902

(22) Filed: Mar. 27, 2012

Related U.S. Application Data

(60) Provisional application No. 61/565,421, filed on Nov. 30, 2011.

(51) Int. Cl.
  G06F 7/00 (2006.01)
  G06F 17/30 (2006.01)

(52) U.S. Cl.
  USPC .......................................................... 707/741

(58) Field of Classification Search
  USPC ...................... 707/741, 803, 999.1
  See application file for complete search history.

(56) References Cited

U.S. PATENT DOCUMENTS

| | | | |
|---|---|---|---|
| 5,560,007 A | 9/1996 | Thai | |
| 5,745,890 A | 4/1998 | Burrows | |
| 6,105,019 A | 8/2000 | Burrows | |
| 6,289,334 B1 | 9/2001 | Reiner et al. | |
| 6,963,869 B2 | 11/2005 | Burrows | |
| 7,043,469 B2 | 5/2006 | Goralwalla et al. | |
| 7,406,460 B2 | 7/2008 | Burrows | |
| 7,467,163 B1 | 12/2008 | Dodds et al. | |
| 7,689,550 B2 | 3/2010 | Lee et al. | |
| 8,099,422 B2 | 1/2012 | De Bellis | |
| 8,560,509 B2 | 10/2013 | Xia et al. | |
| 2003/0140035 A1 | 7/2003 | Burrows | |
| 2004/0167904 A1* | 8/2004 | Wen et al. | 707/100 |
| 2004/0243569 A1 | 12/2004 | Burrows | |
| 2005/0055355 A1* | 3/2005 | Murthy et al. | 707/100 |
| 2005/0228792 A1* | 10/2005 | Chandrasekaran et al. | 707/9 |
| 2006/0031811 A1* | 2/2006 | Ernst et al. | 717/100 |
| 2006/0271556 A1* | 11/2006 | Mukherjee et al. | 707/10 |
| 2010/0042602 A1 | 2/2010 | Smyros et al. | |
| 2011/0119249 A1 | 5/2011 | Flatz et al. | |
| 2011/0225167 A1* | 9/2011 | Bhattacharjee et al. | 707/747 |
| 2011/0246498 A1 | 10/2011 | Forster | |
| 2013/0282765 A1* | 10/2013 | Bhattacharjee et al. | 707/803 |

OTHER PUBLICATIONS

Ben-Gan, Descending Indexes, Index Ordering, Parallelism, and Ranking Calculations, SQL Server Pro, May 24, 2010, 7 pgs.

(Continued)

*Primary Examiner* — Aleksandr Kerzhner
(74) *Attorney, Agent, or Firm* — Morgan, Lewis & Bockius LLP

(57) ABSTRACT

A server system having one or more processors and memory stores a plurality of entities in a schemaless database. The entities are not structured in accordance with a predefined schema. The server system generates an index for the plurality of entities stored in the schemaless database. The index has a plurality of index entries sorted in a sort order. The server system receives a first request from an application and, in response to the first request, accesses an empirically-determined schema and generates a first response based on the empirically-determined schema. The empirically-determined schema is generated from the index. After generating the first response, the server system sends the first response to the application.

29 Claims, 12 Drawing Sheets

(56) References Cited

OTHER PUBLICATIONS

Decipherinfosys, Column Order in a Composite Index, Systems Engineering and RDBMS, May 13, 2008, 4 pgs.
Quassnoi, Explain Extended, Descending Indexes, Apr. 27, 2009, 8 pgs.
Scharlock, Designing Composite Indexes, Sep. 26, 2008, 5 pgs.
PostgreSQL, PostgreSQL 8.1.3 Documentation, Internet Archive Wayback Machine, May 4, 2006, 1 page.

* cited by examiner

Entity Database  
140

| | Keys 502 | Kind 504 | Properties 506 |
|---|---|---|---|
| Entity 0 | 0 | Kind = person | Name = Mike, Age = 51, Birthday = 03/10/1961 |
| Entity 1 | 1 | Kind = business | City = Palo Alto, Employees = 5 |
| Entity 2 | 2 | Kind = person | Name = Jane, Age = 61, Birthday = 11/01/1951 |
| Entity 3 | 3 | Kind = business | City = New York, Employees = 1000 |
| Entity 4 | 4 | Kind = person | Name = Don, Age = 21, Birthday = 05/05/1991 |
| ⋮ | | | |
| Entity 120 | 120 | Kind = picture | Size = 5Mbytes, Pixels = 8M, Camera = Sony |
| Entity 121 | 121 | Kind = business | City = Miami, Employees = 20 |
| Entity 122 | 122 | Kind = business | City = Boston, Employees = 5000 |
| Entity 123 | 123 | Kind = picture | Size = 7Mbytes, Pixels = 10M, Camera = Nikon |
| ⋮ | | | |
| Entity 700 | 700 | Kind = picture | Size = 2Mbytes, Pixels = 4M, Camera = Canon |
| Entity 701 | 701 | Kind = person | Name = Karen, Age = 31, Birthday = 01/01/1981 |
| Entity 702 | 702 | Kind = picture | Size = 2Mbytes, Pixels = 3M, Camera = Sony |
| Entity 703 | 703 | Kind = person | Name = Tom, Age = 61, Birthday = 11/01/1951 |
| ⋮ | | | |

Figure 5A

GENERATING AN EMPIRICALLY-DETERMINED SCHEMA FOR A SCHEMALESS DATABASE

RELATED APPLICATIONS

This application claims priority to U.S. Provisional Application Ser. No. 61/565,421, filed Nov. 30, 2011, entitled "Generating an Empirically-Determined Schema for a Schemaless Database," which is incorporated by reference herein in its entirety.

FIELD OF THE INVENTION

The present invention relates generally to the field of distributed client-server computer network systems, and in particular, to a system and method for determining a schema of a database.

BACKGROUND OF THE INVENTION

A predefined database schema is an important aspect of many conventional database systems that defines the structure of the database and the relationships between data in the database. Such database schemas are used in many database functions that enable searching, organizing, sorting, and navigating the database. Without a database schema, some or all of these functions would be difficult or impossible to perform.

SUMMARY

Many conventional databases (e.g., relational databases) have a static predefined schema. However, schemaless databases (e.g., databases without a predefined schema) are becoming increasingly popular. Schemaless databases provide certain advantages over traditional schema-based databases such as the flexibility to add or insert new component values and/or component types (kinds, properties, property values, namespaces etc.) dynamically to an existing database, and the ability to adapt and customize the database structure for different applications "on the fly" (e.g., while the database is accessible for normal data operations). The enhanced flexibility of schemaless databases over databases with predefined schemas makes schemaless databases better suited for many types of applications.

While schemaless databases provide added flexibility over databases with predefined schemas, the lack of a predefined schema limits the functionality of schemaless databases when performing operations that would typically require knowledge of a database schema. It would be advantageous to access a schema for a schemaless database, thereby enabling the schemaless database to provide the flexibility of a schemaless database without the drawbacks of not having a predefined schema. However, as the schema of the database may change depending on the data stored in the schemaless database, previously generated schemas for a schemaless database can quickly become outdated or inaccurate. Moreover, the task of generating an empirically-determined schema for a schemaless database can take a long time to generate and/or be a computationally intensive task. Thus, it would be advantageous to be able to quickly and efficiently generate an empirically-determined schema for a schemaless database.

In some embodiments, a method is performed at a server system having one or more processors and memory storing one or more programs for execution by the one or more processors so as to perform the method. The method includes storing multiple entities in a schemaless database, where the entities are not structured in accordance with a predefined schema. The method also includes generating an index for the multiple entities stored in the schemaless database, where the index has a plurality of index entries sorted in a sort order. The method further includes receiving a first request from an application, and in response to the first request: accessing an empirically-determined schema, where the empirically-determined schema is generated from the index, generating a first response based on the empirically-determined schema and sending the first response to the application.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 5A is a block diagram illustrating an entity database including information about entities stored in a datastore server system, in accordance with some embodiments.

DESCRIPTION OF EMBODIMENTS

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client, application server and datastore server systems, which typically inter-operate in a distributed client-server system and corresponding methods of generating and using an empirically-determined schema from the index.

Figure 1:
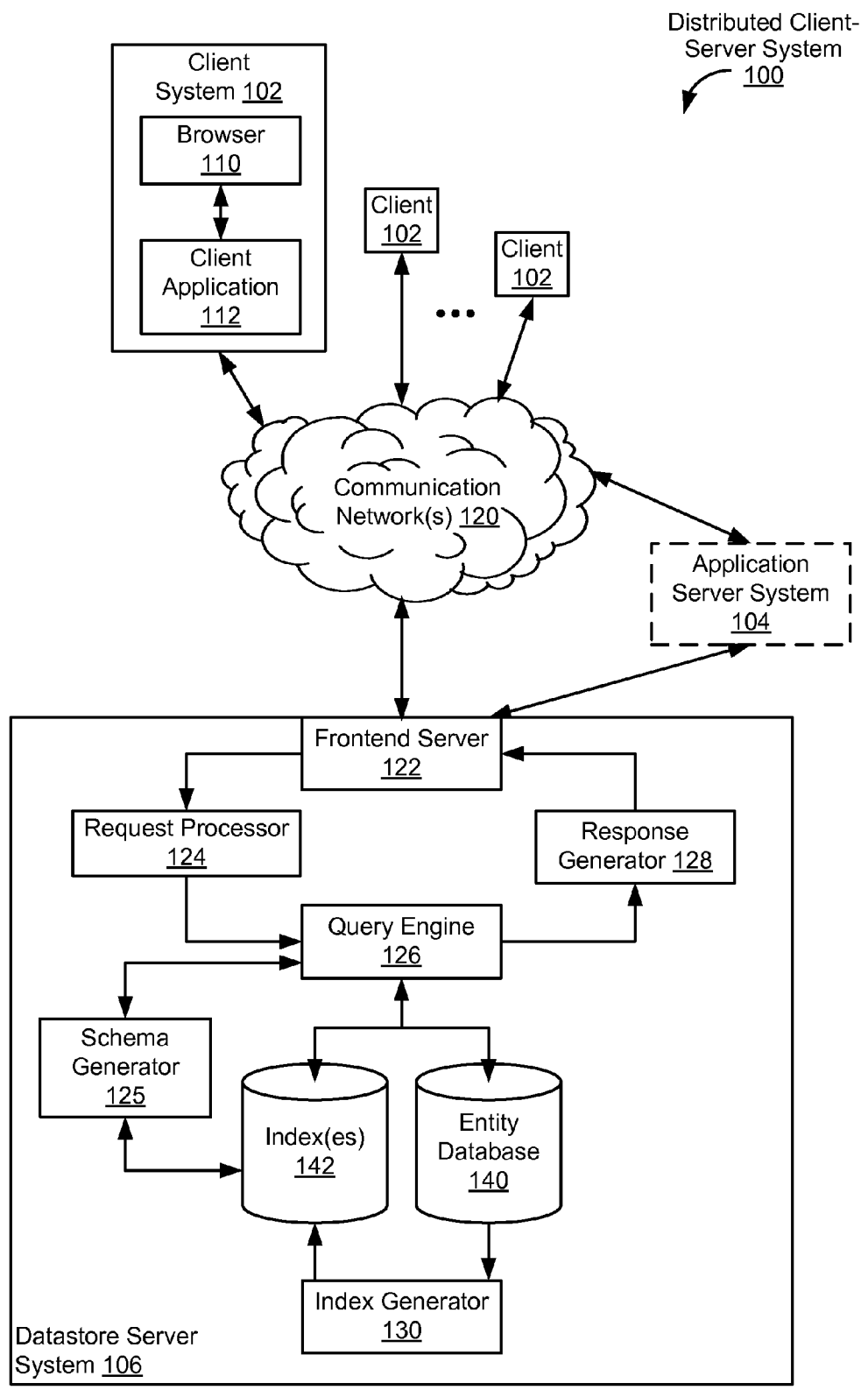
FIG. 1 is a block diagram illustrating a distributed client-server system, in accordance with some embodiments.

FIG. 1 includes a block diagram illustrating an example of a distributed client-server system 100 for sending and responding to requests based on an empirically-determined schema for a schemaless database. System 100 includes one or more Client System(s) 102 (also referred to herein as "Client 102"), an Application Server System 104 (also referred to herein as "App Server 104"), a Datastore Server System 106 (also referred to herein as "Datastore Server 106") and a Communication Network 120 for connecting Clients 102, App Server 104 and Datastore Server 106 to each other. Communication Network 120 optionally includes the Internet, one or more local area networks (LANs), one or more wide area networks (WANs), other types networks, or a combination of such networks.

Client 102 optionally includes Browser 110 and/or Client Application 112. Browser 110 can be a general purpose Internet browser (sometimes called a Web browser) having a browser window used for displaying an application interface. A web application for submitting a data request is optionally implemented using hypertext markup language (HTML) or extensible markup language (XML) elements that are rendered by Browser 110. Alternatively, a data request is, optionally, submitted via a standalone Client Application 112. After a user submits a data request through Browser 110 or standalone Client Application 112, Client 102 relays the request to Datastore Server 106 via Communication Network 120. Datastore Server 106 processes the data request and transfers results and, optionally, a set of display information back to Client 102. Client Application 112 and/or Browser 110 use(s) the results and display information to render an updated application state at Client 102.

In some implementations, Datastore Server 106 includes Frontend Server 122, Request Processor 124, Schema Generator 125, Query Engine 126, Response Generator 128, Index Generator 130, Entity Database 140, one or more Index(es) 142. Index Generator 130 processes information about the entities that are stored in Entity Database 140 to produce Index(es) 142 for use by Query Engine 126 when performing a search query. Alternatively or in addition, Index Generator 130 retrieves information about entities from a remote source such as a remote database or web crawler that systematically retrieves information from a plurality of remote sources (e.g., websites). These operations are typically performed by Index Generator 130 prior to receiving the request at Datastore Server 106. In addition, Index Generator 130 typically continues to update Index(es) 142 in between requests or queries. Schema Generator 125 generates empirically-determined schemas based on information stored in Index(es) 142, as described in more detail below, and provides the empirically-determined schema to Query Engine 126, which in turn communicates the empirically-determined schema to Response Generator 128.

Frontend Server 122 relays requests from Clients 102 to Request Processor 124, which optionally processes a request by selecting an order to apply filters and sort orders specified in the request and transmits the processed request to Query Engine 126. The Request Processor 124 processes the request so as to improve the performance characteristics of the request (e.g., by determining an order to apply filters that reduces the time to perform the request and/or reduces the maximum or total processor usage). Query Engine 126 identifies, in Index(es) 142, indexes and index portions adapted for responding to the request and performs the request on the identified indexes and/or index portions to generate a response.

Response Generator 128 generates a response based on an empirically-determined schema generated by Schema Generator 125. Response Generator 128 also, optionally, determines display information for the response. The response and, optionally, display information is passed to Frontend Server 122, which in turn passes the results to Client 102 via Communication Network 120 or to App Server 104 for display at Client 102 (e.g., via Browser 110 or Client Application 112).

Figure 2:
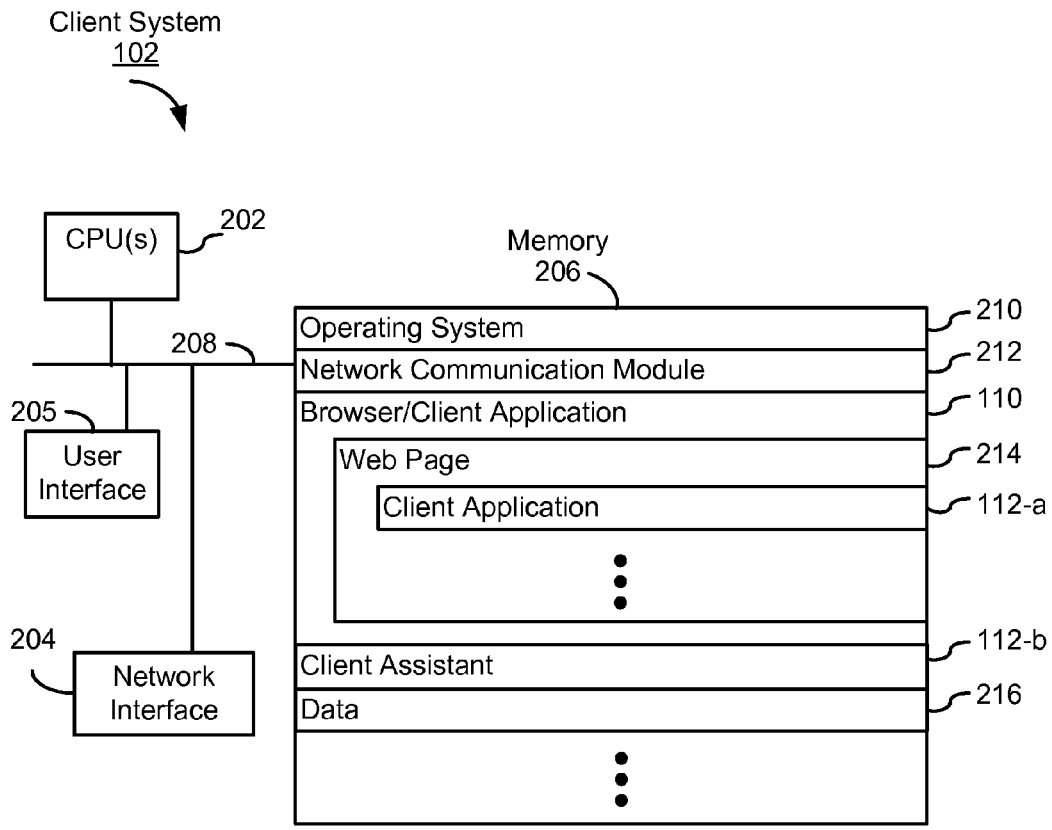
FIG. 2 is a block diagram illustrating a client system, in accordance with some embodiments.

FIG. 2 is a block diagram illustrating a Client System 102 in accordance with some embodiments. Client 102 typically includes one or more processing units CPU(s) 202, one or more network or other Communication Interfaces 204, Memory 206 a User Interface 205 comprising a display device and a keyboard, mouse, touchpad, touchscreen or other input device, and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

Operating System 210 that includes procedures for handling various basic system services and for performing hardware dependent tasks;

Network Communication Module (or instructions) 212 that is used for connecting Client System 102 to other computers (e.g., App Server 104 or Datastore Server 106) via one or more Network Interfaces 204 (wired or wireless) and one or more Communication Networks 120 (FIG. 1), such as the Internet, other wide area networks, local area networks, metropolitan area networks, and so on;

Web Browser 110 for loading web pages such as a Web Page 214, which optionally includes code for executing a Client Application 112-*a* as an embedded application in Web Page 214, where Client Application 112-*a* sends requests to Datastore Server 106 or to App Server 104 and displays data received from Datastore Server 106 or from App Server 104 (e.g., information corresponding to an empirically-determined schema for a schemaless entity database stored at Datastore Server 106);

dedicated Client Application 112-*b* (e.g., a stand-alone email client) for sending requests to Datastore Server 106 or to App Server 104 and displaying data received from Datastore Server 106 or from App Server 104 (e.g., information corresponding to an empirically-determined schema for a schemaless entity database stored at Datastore Server 106); and optionally, Data 216 such as cached data (e.g., recently accessed entities, responses to prior requests, etc.), and/or information about empirically-determined schema(s) received from Datastore Server 106 or App Server 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 may store additional modules and data structures not described above.

Figure 3:
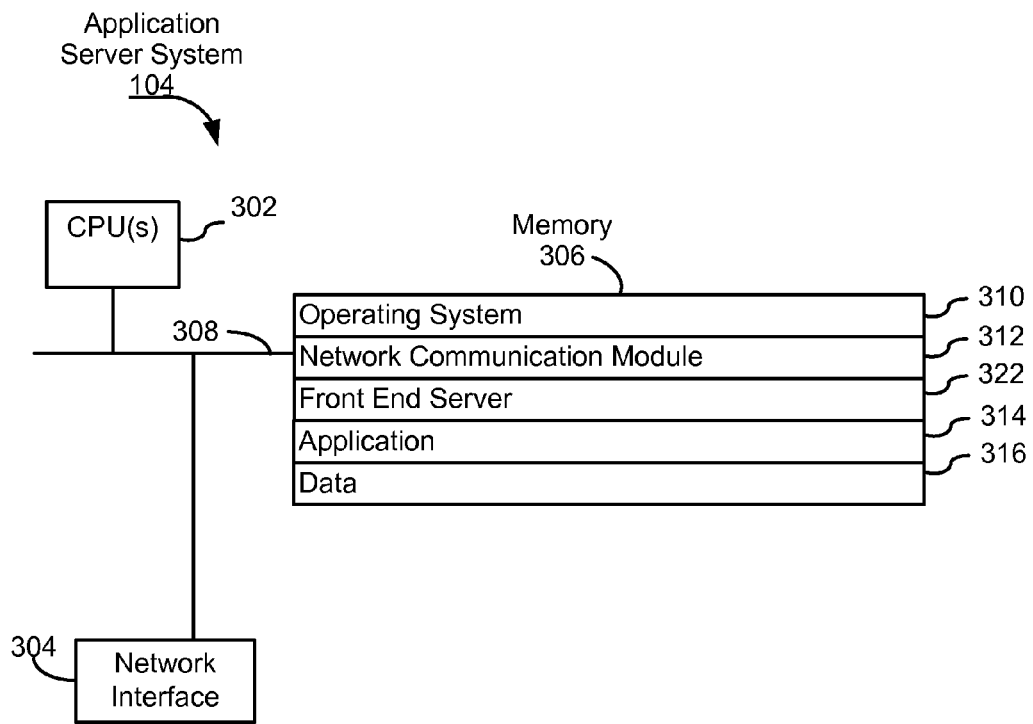
FIG. 3 is a block diagram illustrating an application server system, in accordance with some embodiments.

FIG. 3 is a block diagram illustrating an Application Server System 104 (also referred to herein as "App Server 104") in accordance with some embodiments. App Server 104 typically includes one or more processing units CPU(s) 302, one or more network or other Communications Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312 that is used for connecting App Server 104 to other computers (e.g., Client 102 or Datastore Server 106) via one or more Network Interfaces 304 (wired or wireless), and one or more Communication Networks 120 (FIG. 1), such as the Internet, other wide area networks, local area networks, metropolitan area networks, and so on;

Frontend Server 322 for coordinating communication between App Server 104, Clients 102, Datastore Server 106 and any other computer systems with which App Server 104 communicates;

Application 314 for processing requests from Clients 102 and relaying the requests to Datastore Server 106 corresponding to the client-specified requests, in some embodiments, Application 314 is a backend of Client Application 112 at Client 102, thus Client 102 interacts primary with Application 314, and Application 314 makes specific data requests to Datastore Server 106 that enable Datastore Server 106 to respond to the client-specified requests from Client 102;

optionally, Data 316 such as cached data (e.g., recently accessed entities, responses to prior requests, etc.), and/or information about empirically-determined schema(s) received from Datastore Server 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an Application Server System 104 and how features are allocated among them will vary from one implementation to another, and optionally depends in part on the amount of data traffic that the system must handle during peak usage periods as well as during average usage periods.

Figure 4:
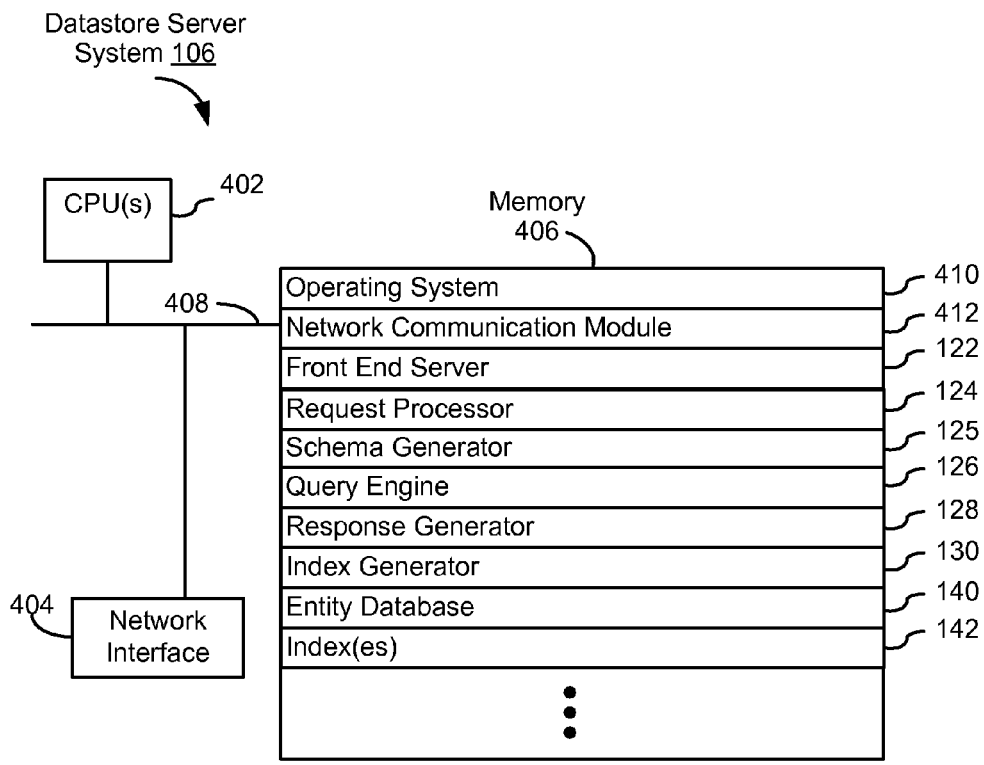
FIG. 4 is a block diagram illustrating a datastore server system, in accordance with some embodiments.
Figure 5B:
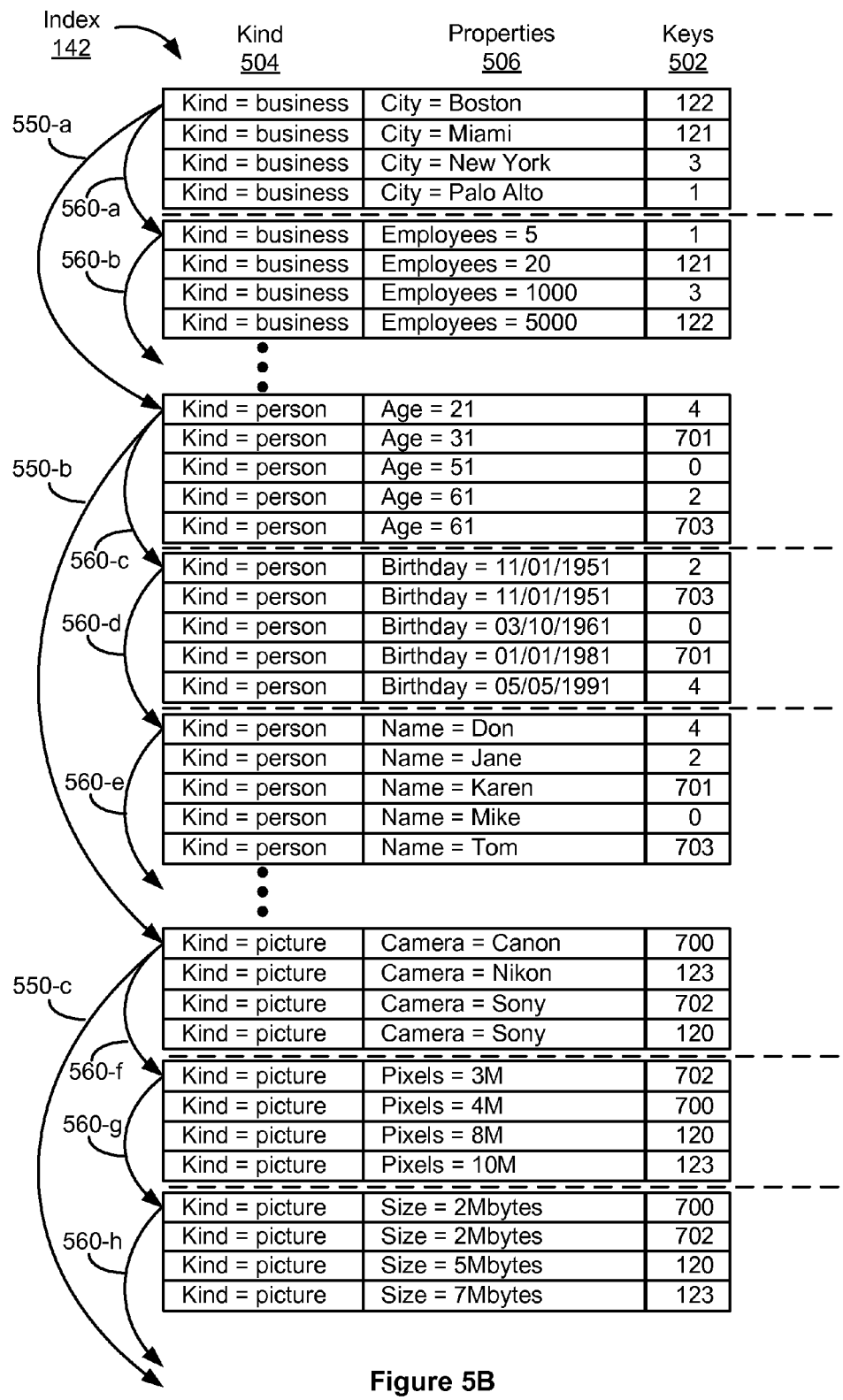
FIG. 5B is a block diagram illustrating an index including index entries for entities stored in an entity database, in accordance with some embodiments.
Figure 5C:
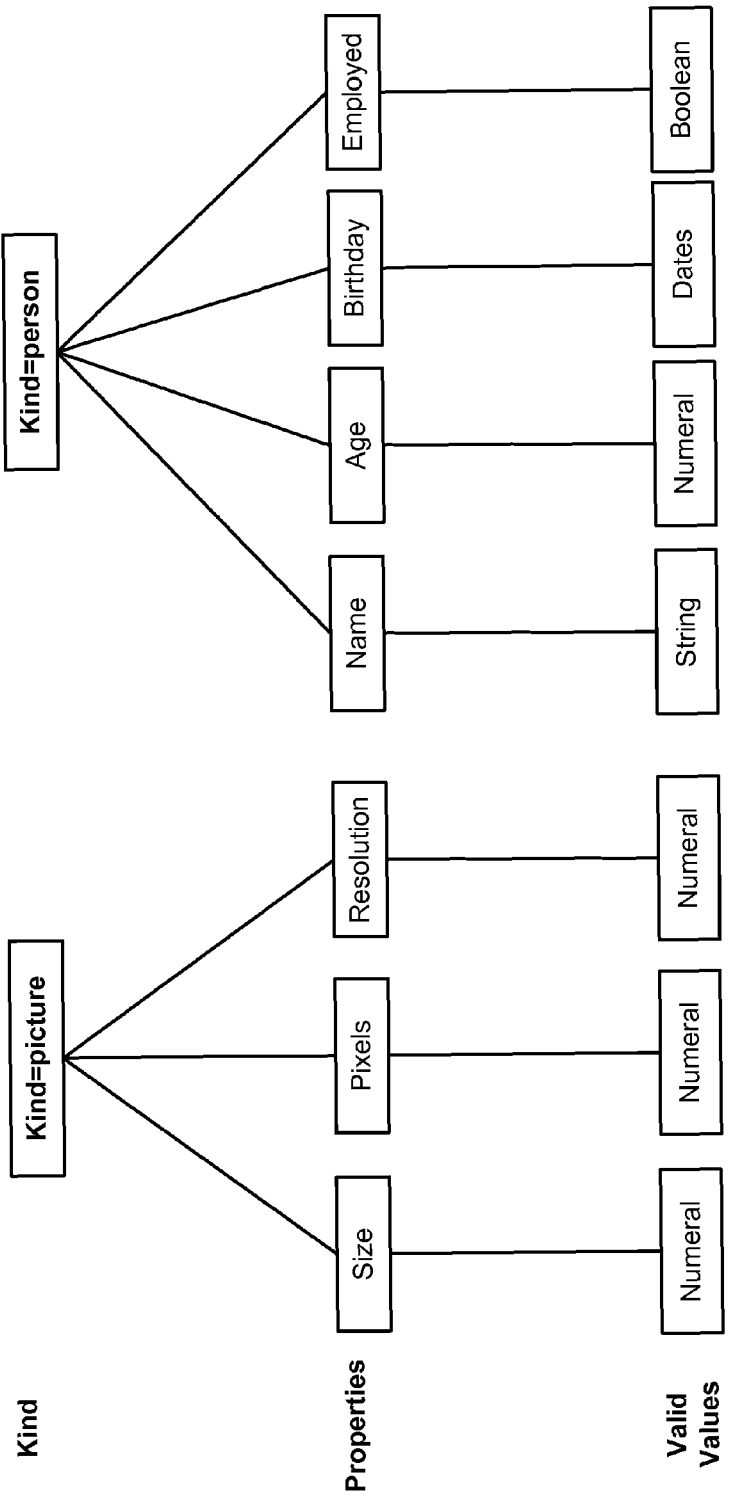
FIG. 5C is a block diagram illustrating a database schema for an entity database, in accordance with some embodiments.

FIG. 4 is a block diagram illustrating a Datastore Server System 106 (also referred to herein as "Datastore Server 106") in accordance with some embodiments. Datastore Server 106 typically includes one or more processing units CPU(s) 402, one or more network or other Communications Interfaces 404, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

- Operating System 410 that includes procedures for handling various basic system services and for performing hardware dependent tasks;
- Network Communication Module (or instructions) 412 that is used for connecting Datastore Server 106 to other computers (e.g., Client 102 or App Server 104) via one or more Network Interfaces 404 (wired or wireless), and one or more Communication Networks 120 (FIG. 1), such as the Internet, other wide area networks, local area networks, metropolitan area networks, and so on;
- Frontend Server 122 for coordinating communication between Datastore Server 106, App Server 104, Clients 102 and any other computer systems with which Datastore Server 106 communicates;
- Request Processor 124 for converting a request received from Client 102 or App Server 104 into a request to be processed by Query Engine 126; for multi-step requests, the converting optionally includes revising the order and/or composition of the steps so as to improve the speed and/or efficiency of performing the request;
- Schema Generator 125 for generating empirically-determined schema based on Index(es) 142; in some implementations, Schema Generator 125 generates empirically-determined schema by traversing at least a portion of the index according to a sort order (e.g., a predefined monotonic ordering scheme for ordering index entries in the index) and in some cases according to a set of filters based on component values of index entries of Index(es) 142;
- Query Engine 126 for accessing the empirically-determined schema generated by Schema Generator 125 and processing the request received from Client 102 or App Server 104 by identifying index portions and searching the index portions, in accordance with the empirically-determined schema;
- Response Generator 128 for obtaining empirically-determined schema generated by Schema Generator 125, generating a response in accordance with the empirically-determined schema, and generating display information to be transmitted to Client 102 or App Server 104, where the display information specifies formatting of the responses at Client 102 or App Server 104;
- Index Generator 130 for generating indexes for use in processing requests; in some implementations, the indexes are generated by generating, updating and sorting index entries such that index entries sharing a common component value have consecutive positions in the index; in some implementations, Index Generator 130 generates a large number of indexes (e.g., at least one index for each property that can be used to sort and/or filter responses) so that for each possible combination of filters and sort orders in a request, there exists an index including an index portion where the index entries matching the combination of filters are arranged in a contiguous block of index entries sorted in the sort order; in some implementations, Index Generator 130 updates Index(es) 142 in accordance with updates to Entity Database 140;
- Entity Database 140 for storing entities or information about entities; one or more Index(es) 142 which store information about entities and properties of the entities, typically the Index(es) 142 are each sorted in accordance with values of the components (e.g., kinds, properties) for the entities, as described in greater detail below with reference to FIGS. 5A-5C;

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server 106 and how features are allocated among them will vary from one implementation to another, and optionally depends in part on the amount of data traffic that the system must handle during peak usage periods as well as during average usage periods.

Entities, Indexes and Empirically-Determined Schema

FIG. 5A illustrates an entity database including information about entities stored in a datastore server system, in accordance with some embodiments. Entity Database 140 shown in FIG. 5A stores information about entities (data objects) having Keys 502 (unique identifiers), and components having component types such as Kinds 504, and Properties 506. In some embodiments, an entity has a set of metadata including a kind and one or more properties, each property having one or more possible values. In some implementations, a plurality of the entities each have a single kind. In some implementations, at least some of the kinds are associated with one or more properties. Possible values of properties can include either specific valid values that have been stored in Entity Database 140 for a particular property (e.g., "hazel," "brown," "blue" or "green" for an "Eye Color" property) or specific types of values that are valid (e.g., integers, floating point values, strings, dates, Boolean values and/or binary data). In other embodiments there are properties that are not associated with any particular kind or are associated with multiple kinds. As one example, in some circumstances, both a person and a business have a "name" property that can be any string of characters.

In the example shown in FIG. 5A, Entity 0 has Key=0, Kind="person" and Properties "name," "age," and "birthday" which have property values corresponding to "Mike," "51," and "Mar. 10, 1961" respectively. Similarly, Entity 122 has Key=122, Kind="business" and Properties "city" and "employees" with property values "Boston" and "5000" respectively. A property with multiple values can have values of mixed types (e.g., for a particular entity, a property could have one value that is an integer and another value that is a string). It should be understood that the metadata described above (e.g., the Kinds, Properties and values) can be used either as predefined sort parameters or to determine whether respective entities meet filter criteria based on the metadata when searching for entities in Entity Database 140.

In some embodiments, each entity has a key that uniquely identifies the entity, also called a "unique identifier" for the entity. In some implementations, a key is simply an Entity ID that is associated with the entity (e.g., an Entity ID assigned by Datastore Server 106). In other implementations, the key includes a kind and the Entity ID. The kind categorizes the entity so that it can more easily be identified and retrieved. Additionally, in some embodiments, a key uniquely identifies an entity for a particular application (e.g., Application 314 in FIG. 3). Thus, in some implementations an application identifier (e.g., an identifier of Application 314 in FIG. 3) and, optionally, a namespace identifier (e.g., an identifier of a namespace or other logical division of data for Application 314 in FIG. 3) are used in addition to the key to uniquely identify an entity in Entity Database 140.

In some embodiments, an entity is requested by Client 102 or App Server 104 either by submitting a request for an entity associated with a particular key, or by requesting performance of a search query for entities that match a specified component type (Kind or Property) and value. For example, in the case of Entity Database 140 shown in FIG. 5A, a search request for all entities with Kind="business" will result in Entity 1, Entity 3, Entity 121 and Entity 122 (from among the entities listed in Entity Database 140 in FIG. 5A). Execution of a search query for entities that match one or more specified properties and/or values will typically first produce the key for a matching entity using Index(es) 142 and then retrieve the matching entity or information representative of the matching entity from Entity Database 140. In some implementations, Entity Database 140 does not require that all entities of a given kind have the same properties, as there is no predefined schema that specifies a predefined set of valid properties for respective kinds of entities.

FIG. 5B illustrates an example of an index (e.g., Index 142) generated from Entity Database 140 (of FIG. 5A). As shown in FIG. 5B, Index 142 includes a plurality of index entries (rows) sorted in accordance with Kind 504, Properties 506, Property Values and Key 502, in that order. In other words, Index 142 is obtained by sorting the index entries by their kinds, and within respective kinds sorting the index entries by their properties, and within respective properties sorting the index entries by their property values, and within respective property values sorting the index entries by their keys. There is an index entry for each value of a property of an entity. In the example shown in FIG. 5B, respective index entries include a single property value for a respective entity, thus, if a particular entity has a multi-valued property, there will be at least two index entries for the entity (e.g., two index entries in the same index with the same key but different filter values), one sorted in accordance with the first value of the property and another sorted in accordance with the second value of the property. Additionally, where an entity has multiple properties, the entity has multiple corresponding index entries in different portions of Index 142, for example Entity 4 has an index entry for "Name=Don" and an index entry for "Birthday=May 5, 1991."

For purpose of illustration, in Index 142 in FIG. 5B, index entries corresponding to Kind="business" are placed contiguously together in a cluster (sometimes called an "index portion") or have consecutive positions and arranged ahead of all contiguously arranged index entries corresponding to Kind="person" which are in turn followed by contiguously arranged index entries with Kind="picture." Similarly, among the cluster of index entries with Kind="business," the index entries are arranged alphabetically with respect to Properties; the index entries with Property="city" are clustered and appear ahead of the cluster of index entries with Property="employees." Within the cluster of index entries having Property="city," the index entries are further sorted by property values (in this case, strings), arranged alphabetically. In the event of two index entries in the index having identical kinds, properties and property values, the index entries are numerically arranged by ascending order of their keys. In this example, two index entries have Kind="person," Property="age," and Property Value="61." These two index entries are further arranged by the numerical values of their keys; the entry with key=2 appears ahead of the entry with key=703 in Index 142. In some implementations, as new entities are added to Entity Database 140, new index entries are created in Index 142, and are placed in appropriate locations in accordance with the sort order of Index 142. While Index 142 has been described as being sorted in a particular sort order for the purposes of illustration, it should be understood that many other possible sort orders would provide similar advantages to those described herein.

The information (e.g., kind, property type and property value information) included in the index entries, and the sorting of Index 142 in accordance with this information (one example of which is shown in FIG. 5B) enables an empirically-determined schema to be generated quickly and efficiently by traversing at least a portion of Index 142. In some embodiments, traversing Index 142 includes skipping (550, 560) one or more index entries in accordance with a sort order of Index 142 (e.g., a monotonic ordering scheme for ordering the index entries). In some implementations, the skipping (550, 560) includes skipping consecutive index entries that share a common component value (common Kind value and/or common Property value). The arrows in the index are illustrative of skipping consecutive index entries that occur within a cluster of a common kind or skipping consecutive index entries that occur within a cluster of a common property. This example is merely illustrative of traversing an index generated from an entity database, according some embodiments. In some embodiments, the schema is generated by traversing a same index multiple times (e.g., traversing the index a first time by skipping 550 through the index to identify valid kinds and traversing the index a second time by skipping 560 through the index to identify properties associated with the kinds or traversing a portion of the index corresponding to entities of a particular kind by skipping 560 through the portion of the index corresponding to the particular kind to identify properties associated with the particular kind and repeating this traversal for one or more of the previously identified kinds). Alternatively, in some embodiments, the schema is generated by traversing through a first index that is sorted by kinds to identify valid kinds for the database and traversing a second index that is sorted by properties to identify valid properties for the database. It should be understood that additional traversals of the index are, optionally, performed to determine valid values for the identified properties.

In the following description, the symbol > stands for "greater than" in accordance with a predefined ordering, such as a numerical or alphabetical ordering. As shown in FIG. 5B, Datastore Server 106 (or Schema Generator 125) traverses Index 142 to determine valid kinds for an empirically-determined schema by identifying a first index entry with a first kind (e.g., Kind="business") and then skips (550-*a*) to a next index entry with a Kind>the first kind (e.g., Kind="business"). As shown in FIG. 5B, Schema Generator 125 skips to a first index entry with a second kind (e.g., Kind="person"). Subsequently, Datastore Server 106 (or Schema Generator 125) skips (550-*b*) from the first index entry with the second kind (e.g., Kind="person") to a next index entry with a Kind>the second kind (e.g., Kind="person"). As shown in FIG. 5B, Schema Generator 125 skips to a first index entry with a third kind (e.g., Kind="picture"). In some implementations, Datastore Server 106 (or Schema Generator 125) continues to skip (e.g., 550-*c*) through the index until an end of the index is reached or an end of an index portion matching filter criteria (e.g., "generate a schema for all kinds with values starting with letters between A and N") is reached. In some embodiments, where the index entries are sorted alphabetically by kind, the skipping is accomplished by searching for a next index entry with a kind=(current kind)+(null character), where the null character (sometimes represented as ˆ0) is the first character in the alphabetical sort order, which finds the next index entry that has a kind greater than the current kind in the alphabetical sort order. As valid kinds are identified, they are added to an empirically-determined schema for the entity database.

Similarly Datastore Server 106 (or Schema Generator 125) traverses Index 142 to determine valid properties for an empirically-determined schema by, for each of a plurality of respective kinds, identifying a first index entry in a portion of Index 142 corresponding to the respective kind (e.g., Kind=person) with a first property (e.g., Property="age") and then skips (560-*c*) to a next index entry with a Property>the first property (e.g., Property="birthday"). As shown in FIG. 5B, Schema Generator 125 skips to a first index entry with a second property (e.g., Property="birthday"). Subsequently, Datastore Server 106 (or Schema Generator 125) skips (560-*d*) from the first index entry with the second property (e.g., Kind="birthday") to a next index entry with a Property>the second property (e.g., Property="name"). As shown in FIG. 5B, Schema Generator 125 skips to a first index entry with a third property (e.g., Property="name"). In some implementations, Datastore Server 106 (or Schema Generator 125) continues to skip (e.g., 560-*e*) through the index portion corresponding to the respective kind until an end of the index portion corresponding to the respective kind is reached and performs a similar operation for a next index portion corresponding to a next identified kind. As the valid properties for respective kinds are identified, they are added to an empirically-determined schema for the entity database. Similar steps are optionally followed to identify valid values and/or valid value types for respective properties. Additionally, in some embodiments properties and/or valid values for properties are identified using a different index that is sorted by property rather than by kind.

In some embodiments, Index 142 is too large to be stored on a single storage device (e.g., database servers, hard drives, flash drives etc.) and thus is distributed across multiple different storage devices. Thus, in situations where a particular kind or property corresponds to a large number of index entries that span multiple storage devices (e.g., the portion for Kind="person" is stored on multiple database servers), traversing Index 142 by skipping over all of the index entries for entities where Kind="person" other than the first index entry where Kind="person" enables an empirically-determined schema to be generated without accessing one or more of the multiple storage devices spanned by index entities corresponding to the particular kind. Generating an empirically-determined schema without accessing one or more of the storage devices on which the index is stored improves performance of the overall system by reducing processing load on the skipped storage device(s) as well as increasing speed of generating the empirically-determined schema by avoiding the time associated with accessing the skipped storage device(s).

FIG. 5C illustrates an example schema generated from Index 142. The schema is arranged such that the one or more kinds have one or more corresponding properties and the properties in turn have one or more valid property values (e.g., integers, floating point values, strings, dates, and binary data). In some embodiments, the schema (as illustrated by the examples in FIG. 5C) is generated based on index entries for entities stored in the schemaless database such as Entity Database 140 shown in FIG. 5A. Thus, the example schema in FIG. 5C shows that for entities with Kind="picture", there are at least three valid properties (e.g., size, pixels and resolution, each of which has a numeric value), while for entities with Kind="person" there are at least four valid properties (e.g., name with valid values that are strings, age with valid values that are numeric, birthday with valid values that are dates, and employment status with valid values that are Boolean values). In some embodiments, the schema is generated by traversing at least a portion of the index (e.g., as described above with reference to FIG. 5B).

In some implementations, the schema shown in FIG. 5C, or a portion thereof, is transmitted to App Server 104 or Client 102 for use in preparing information for display to an end-user. For example, the schema can be used to determine fields to display in a new contact entry (e.g., a name field, an age field, a birthday field, and an employment status selector with the options True/False). As another example, the schema can be used to provide options for sorting (e.g., "sort all results by birthday") search results or restricting searches (e.g., return only entities that correspond to people with ages between 18 and 35). It should be noted that, as entities are added to, deleted from and modified in Entity Database 140, corresponding index entries will be added to, deleted from and modified in Index 142 and the schema shown in FIG. 5C will change, from time to time, in accordance with changes to the entity database. For example, if a user were to delete all entities corresponding to people who have an employment status entered, the employment status branch of the schema would not exist in a subsequently generated empirically-determined schema, as "Employed" would not be identified as a valid property of Kind="person." Similarly, if a user were to modify one or more of the entities corresponding to people so as to include an eye color in those entities (in the entity database), "eye color" would be included as a valid property of Kind="person" in a subsequently generated empirically-determined schema for the entity database.

Responding to a Request Based on an Empirically-Determined Schema

Figure 6:
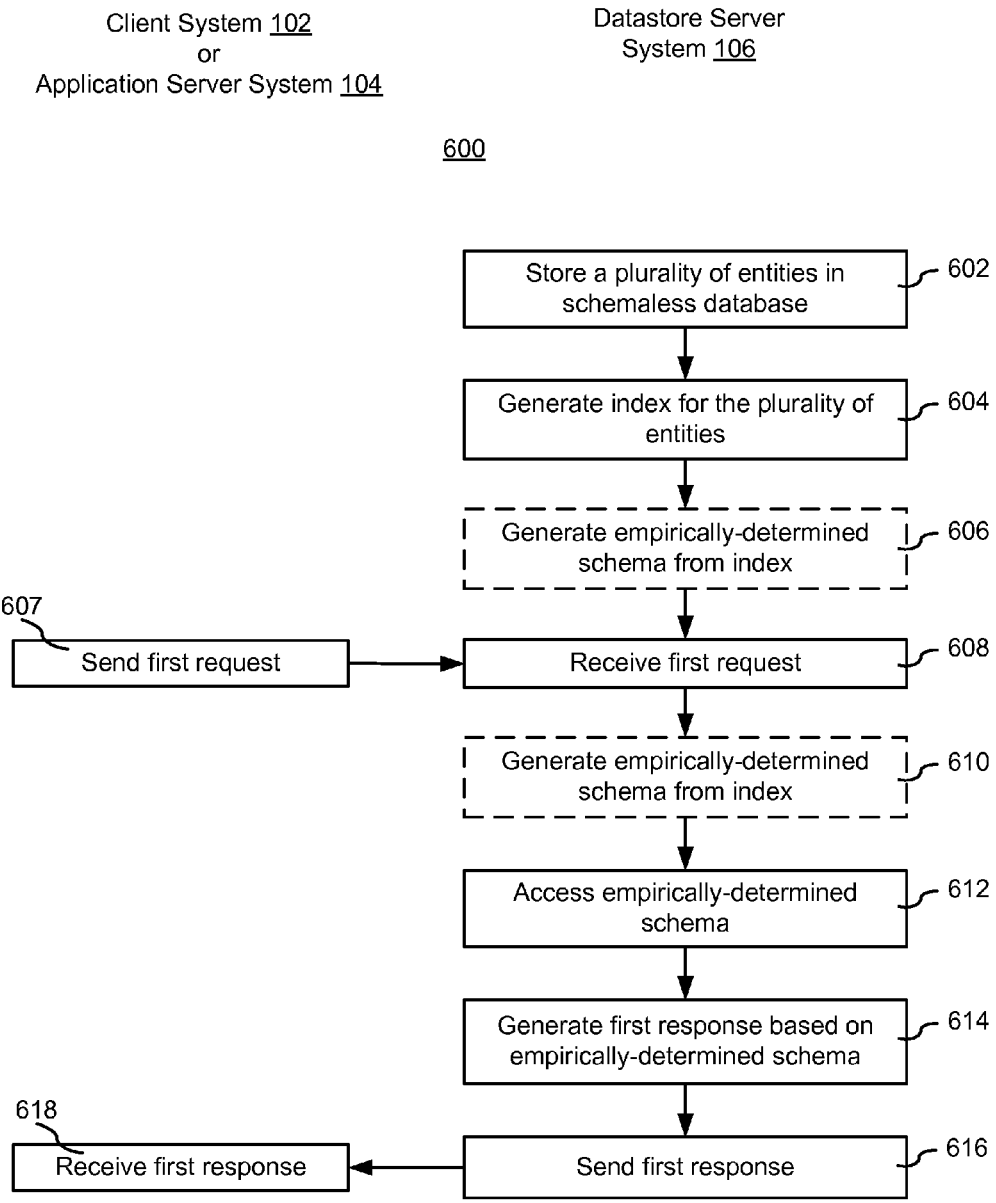
FIG. 6 includes a flow chart illustrating a method for generating an empirically-determined schema for a schemaless database to be used in responding to a request from a client, in accordance with some embodiments.
Figure 7A:
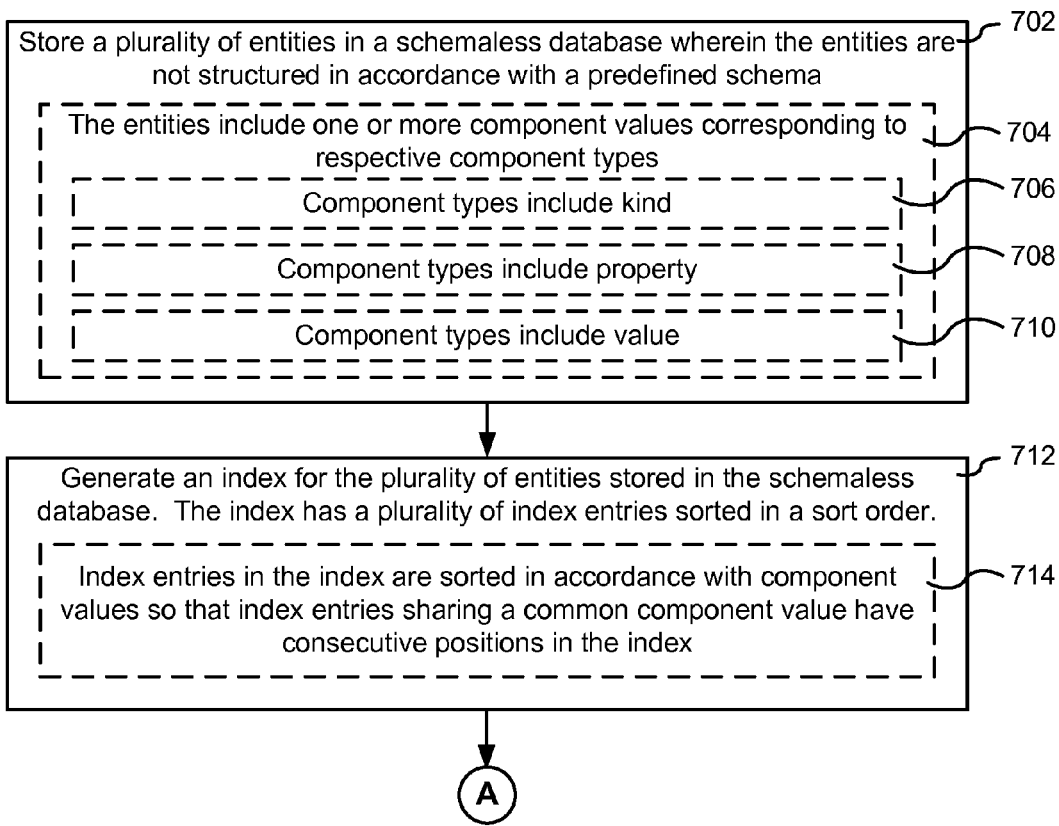
FIGS. 7A-7D include a flow chart illustrating a method for generating an empirically-determined schema, in accordance with some embodiments.
Figure 7B:
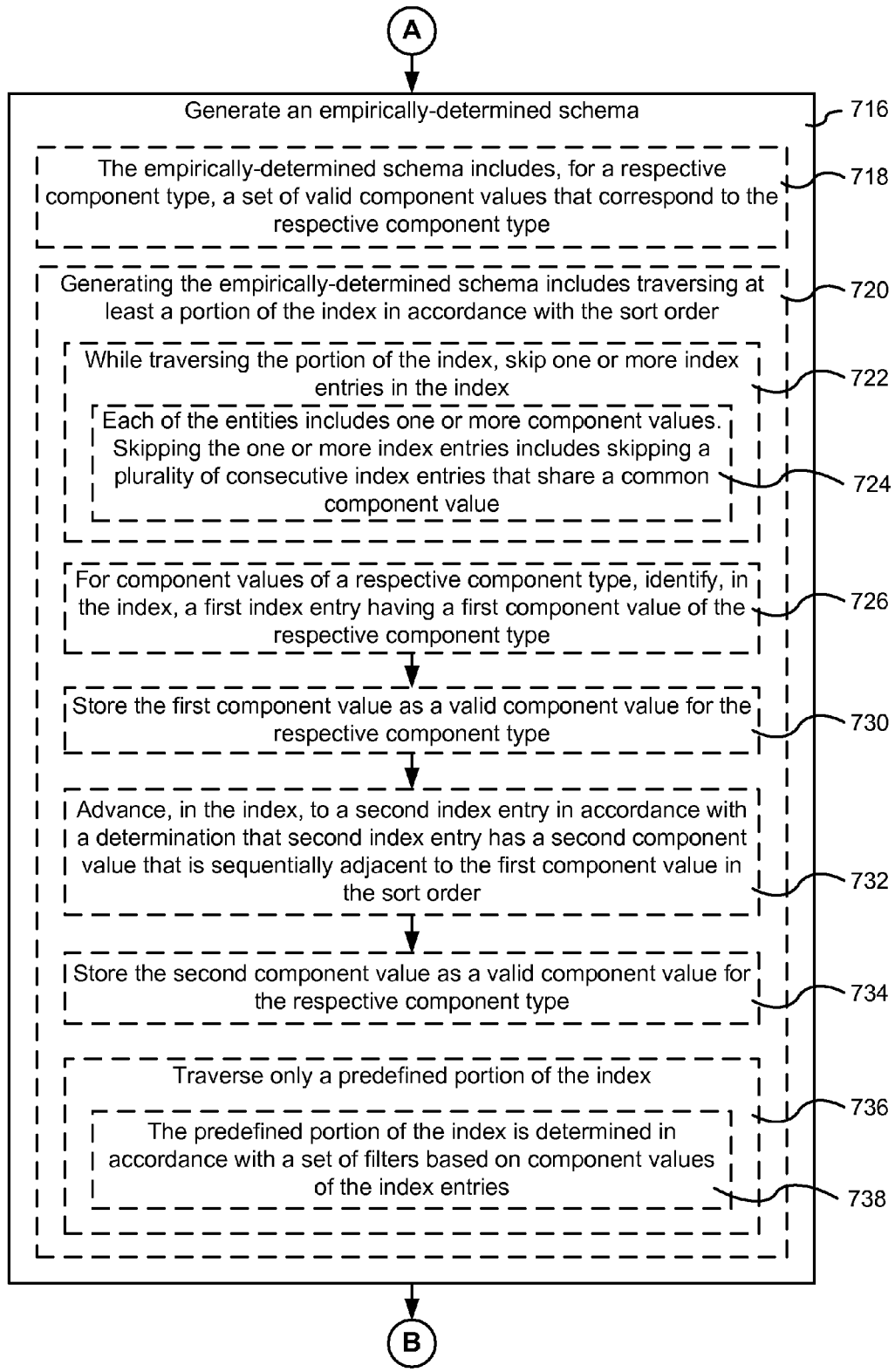
Figure 7C:
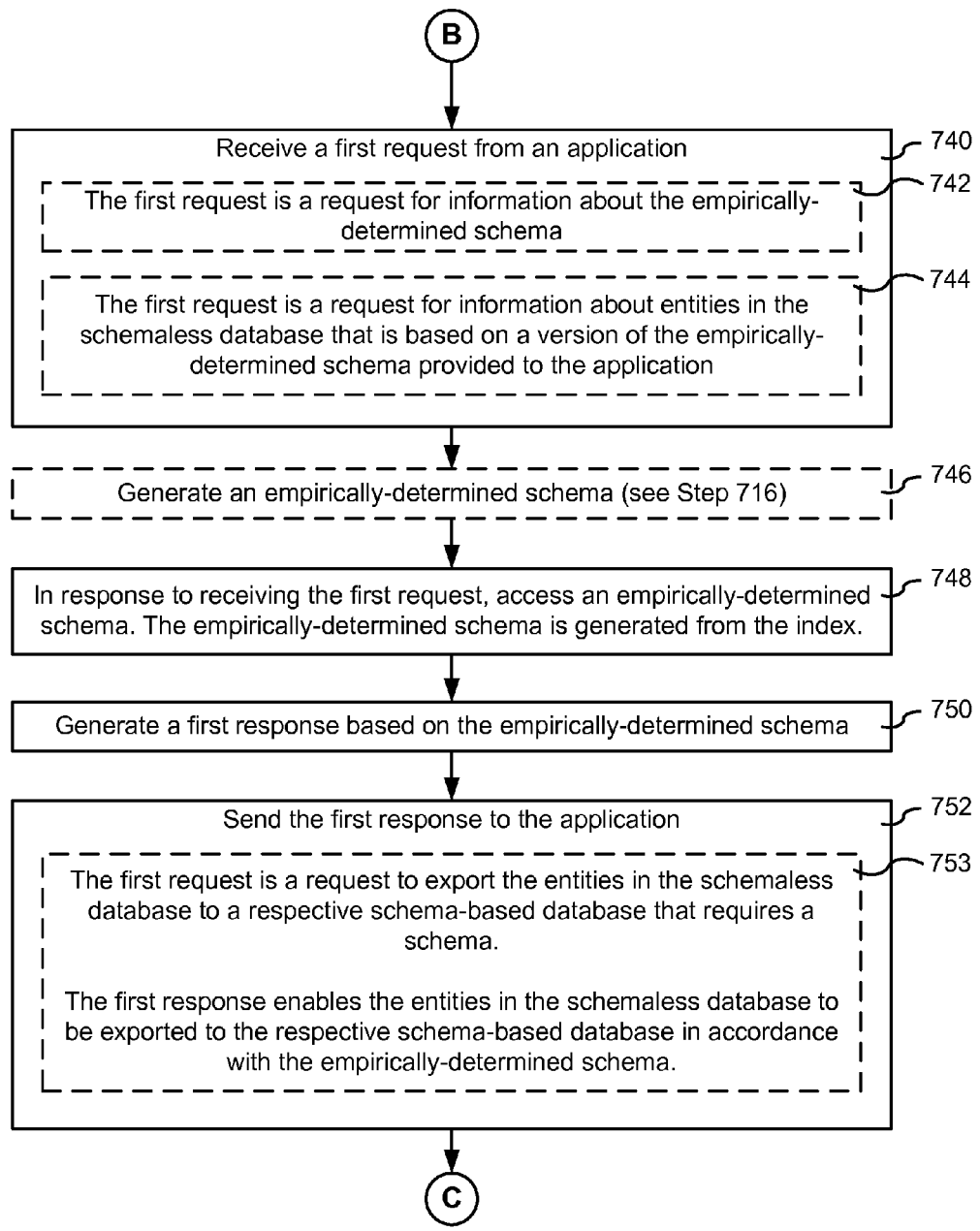
Figure 7D:
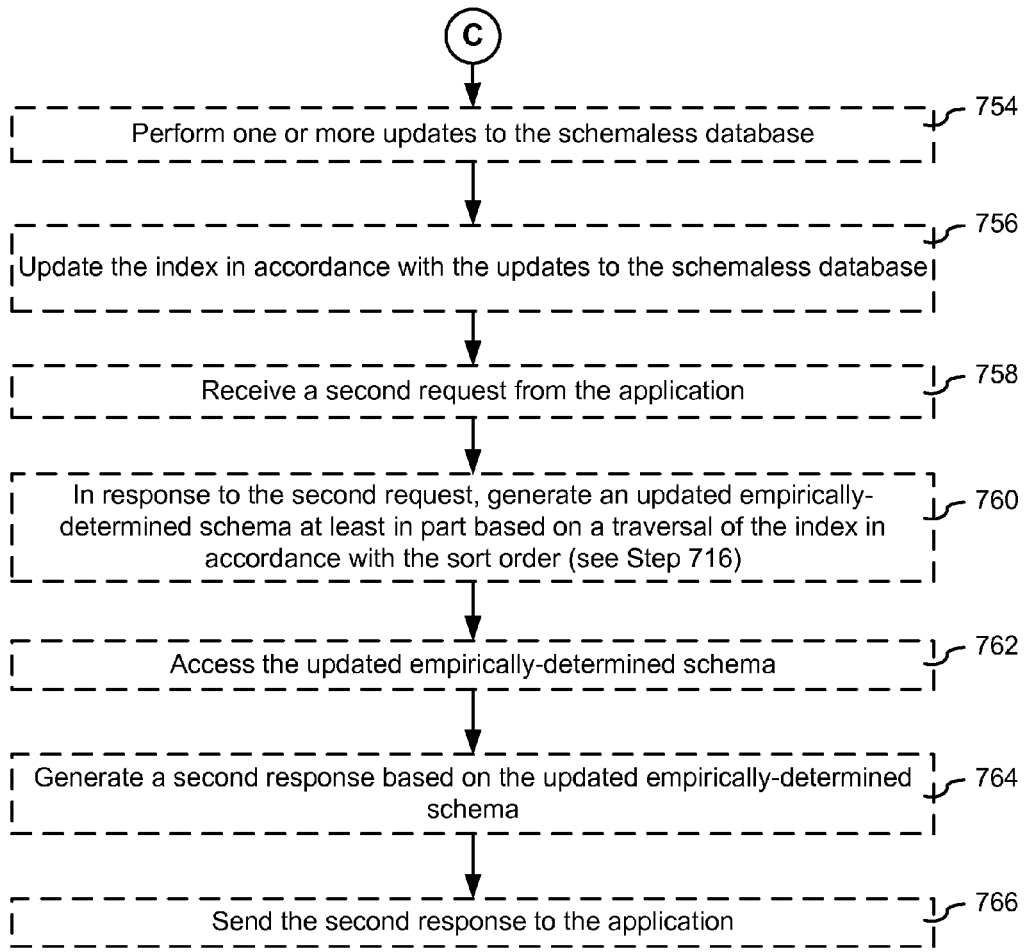

FIG. 6 includes a flowchart representing a method 600 for receiving and processing requests from Client 102 or App Server 104 at Datastore Server 106 and returning responses to Client 102 or App Server 104 based on an empirically-determined schema, according to certain embodiments. Method 600 is, optionally, governed by instructions that are stored in a non-transitory computer readable storage medium and that are executed by one or more processors of one or more computer systems (e.g., Client 102, App Server 104 or Datastore Server 106). Each of the operations shown in FIG. 6 typically corresponds to instructions stored in a computer memory or non-transitory computer readable storage medium (e.g., memory 206 of Client 102 in FIG. 2, memory 306 of App Server 104 in FIG. 3 or memory 406 of Datastore Server 106 in FIG. 4). The non-transitory computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is executed or interpreted by one or more processors. In various embodiments, some operations in method 600 may be combined and/or the order of some operations may be changed from the order shown in FIG. 6.

Datastore Server 106 stores (602) a plurality of entities in a schemaless database. Subsequently (or concurrently, while the entities are added to the database), Datastore Server 106 generates (604) an index for the plurality of entities. In some embodiments, Datastore Server 106 generates (606) an empirically-determined schema from the index. A requesting computer system (e.g., Client 102 or App Server 104) sends (607) a first request to Datastore Server 106. In some embodiments Client 102 communicates with Datastore Server 106 through App Server 104. In other words, as described in greater detail above, in some implementations, App Server 104 runs an instance of a backend application that provides services to a client application at Client 102 and the backend application on App Server 104 communicates with Datastore Server 106 to retrieve entities and schema information for use by the client application or in preparing information to send to the client application.

Datastore Server, receives (608) the first request and determines that the responding to the request requires a schema for the entity database. In some embodiments, an empirically-determined schema is generated prior to receiving the first request. In some embodiments, however, Datastore Server 106 generates (610) the empirically-determined schema in response to (and thus after) receiving the first request (e.g., by traversing an entity index, as described in greater detail above with reference to FIG. 5B). In some implementations, the empirically-determined schema is generated after receiving the first request in accordance with a determination that a previously generated empirically-determined schema is out of date or (stale) in accordance with predefined staleness criteria (e.g., the previously generated empirically-determined schema was last generated or updated at a time that is more than a predefined amount of prior to the current time, where, for example, the predefined amount of time is 15 minutes, 1 hour, 1 day, or 1 week ago, etc.). In response to the request and after the empirically-determined schema has been generated, Datastore Server 106 accesses (612) the empirically-determined schema and generates (614) a first response based on the empirically-determined schema. For example, in some implementations the response includes at least a portion of the empirically-determined schema, or a representation thereof.

After generating the first response, Datastore Server sends (616) the first response to the requesting computer system (e.g., Client 102 or App Server 104), which receives (618) the first response. In situations where the requesting computer system is App Server 104, App Server 104 (or a backend application at App Server 104) generates information for the client application at Client 102 based on the empirically-determined schema, such as a "new contact form" or "advanced search form" that provides structure options to a user of the client application at Client 102 based on the empirically-determined schema. In situations where Client 102 is the requesting computer system, Client 102 generates information for the client application based on the empirically-determined schema.

It should be understood that the particular order in which the operations in FIG. 6 have been described are merely examples and are not intended to indicate that the described order is the only order in which the operations could be performed. One of ordinary skill in the art would recognize various ways to reorder the operations described herein. Additionally, it should be noted that details of other processes described herein with respect to method 700 (described herein with reference to FIGS. 7A-7D) are also applicable in an analogous manner to method 600 described above with respect to FIG. 6. For example, the entities, index(es), requests, responses and empirically-determined schema described above with reference to method 600 may have one or more of the characteristics of the various the entities, index(es), requests, responses and empirically-determined schema described herein with reference to method 700. For brevity, these details are not repeated here.

Generating an Empirically-Determined Schema from an Index

FIGS. 7A-7D include a flowchart representing a method 700 for generating a response to an application request based on an empirically-determined schema, which in turn is generated from an index of entities, according to certain embodiments. Method 700 is, optionally, governed by instructions that are stored in a non-transitory computer readable storage medium and that are executed by one or more processors of one or more servers (e.g., Datastore Server 106, FIG. 4). Each of the operations shown in FIGS. 7A-7D typically corresponds to instructions stored in a computer memory or non-transitory computer readable storage medium (e.g., memory 406 of Datastore Server 106 in FIG. 4). The non-transitory computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is executed or interpreted by one or more processors. In various embodiments, some operations in method 700 may be combined and/or the order of some operations may be changed from the order shown in FIGS. 7A-7D.

Datastore Server 106 stores (702) a plurality of entities in a schemaless database (e.g., Entity Database 140 in FIGS. 1 and 5A). In a schemaless database, entities are not structured in accordance with a predefined schema and thus users are not restricted to generating entities that conform to the predefined schema. In some embodiments, the respective entities of the plurality of entities include (704) one or more component values corresponding to respective component types. In some embodiments, the component types include (706) kind. In some embodiments, the component types include (708) property. In some embodiments, the component types include (710) property value. For example, as explained for FIG. 5A, Entity Database 140 has multiple entities, each having a Kind and multiple Properties (e.g., Entity 0 has Kind="person," Properties="name," "age" and "birthday," each Property having a respective property value). In some embodiments these component types could also include a namespace identifier or an application identifier that are used to uniquely identify the entity in a database that stores entities for multiple applications, one or more of which includes multiple namespaces or other logical divisions of data.

Datastore Server 106 generates (712) an index for the plurality of entities stored in the schemaless database, such that the index has multiple index entries sorted in a sort order. In some embodiments, the index is one of a set of one or more indexes. In some embodiments, Datastore Server 106 stores multiple indexes that are sorted in different sort orders for responding to requests for which it is advantageous that entities be identified in different orders. In some embodiments, the sort order is a predefined sort order. For example, in FIG. 5B, Index 142 is generated from Entity Database 140. Each row corresponding to an index entry has a Kind, Property (and corresponding valid property value) and a Key. In this example, Index 142 has entries sorted by Kind, followed by Property, followed by Property Value, followed by Key. In some embodiments, index entries in the index are sorted (714) in accordance with component values so that index entries sharing a common component value have consecutive positions in the index. As shown in FIG. 5B, all index entries within Index 142 having Kind="business" have consecutive positions and are placed contiguously. Further, within the portion of Index 142 where Kind="business," the index entries for entities having Property="city" have consecutive positions, and so on.

Datastore Server 106 generates (716) an empirically-determined schema. In some embodiments, the empirically-determined schema is generated in accordance with a predefined schedule. In some embodiments, the empirically-determined schema is generated in response to a request from a requesting computer system (e.g., Client 102 or App Server 104). In some embodiments, the empirically-determined schema includes (718), for a respective component type, a set of valid component values that correspond to the respective component type. For example in the example schema shown in FIG. 5C, person and picture are valid kinds; while size, pixels and resolution are valid properties of entities of Kind="picture;" and name, age, birthday and employment status are valid properties of entities of Kind="person." Moreover, as shown in FIG. 5C, in some embodiments, a schema indicates valid types of values or valid values for properties (e.g., numeral, string, date, "true," "false," etc.).

In some embodiments, generating the empirically-determined schema comprises traversing (720) at least a portion of the index in accordance with the sort order, the traversing including skipping (722) one or more index entries in the index. In some embodiments, each of the entities includes one or more component values and skipping the one or more index entries includes skipping (724) multiple consecutive index entries that share a common component value. For example, in FIG. 5B, Datastore Server 106 (or Schema Generator 125) skips multiple consecutive index entries sharing a common Kind (as illustrated, for instance, by arrow 550-*b* where, after identifying a first index entry with a Kind="person," Schema Generator 125 skips past other subsequent consecutive index entries (which are ordered, for example, in accordance with a sort order, such as a predefined monotonic sort order) with Kind="person" to a first index entry with Kind="picture"). Similarly, in FIG. 5B Datastore Server 106 (or Schema Generator 125) skips multiple consecutive index entries sharing a common Property (as illustrated, for instance, by arrow 560-*c* where, after identifying a first index entry with a Kind="person," and Property="age," Schema Generator 125 skips past other subsequent consecutive index entries with Kind="person" and Property="age" to a first index entry with Kind="person" and Property="birthday").

In some embodiments, traversing the index includes, for component values of a respective component type identifying (726), in the index, a first index entry having a first component value of the respective component type. After identifying the first index entry, Datastore Server 106 stores (730) the first component value as a valid component value for the respective component type and advances (732), in the index, to a second index entry in accordance with a determination that second index entry has a second component value that is sequentially adjacent to the first component value in the sort order. For example in FIG. 5B, if there are no index entries with a kind that is alphabetically between "person" and "picture," then person is sequentially adjacent to picture in the alphabetical search order. After advancing to the second index entry, Datastore Server 106 stores (734) the second component value as a valid component value for the respective component type. For example, in Index 142 of FIG. 5B, "business," "person" and "picture" are stored as valid Kinds, while "age," "birthday" and "name" are stored as valid properties of Kind="person." Thus, in Index 142 in FIG. 5B, for the component type Kind, the component values include business, person and picture; for the component type Property (of Kind="person"), the component values include "age," "birthday" and "name." Similarly, for the component type Value (of Kind="picture" and Property="camera"), the component values include "Canon," "Nikon" and "Sony," or alternatively, any string.

In some implementations, the second component value (e.g., person) corresponding to the second index entry is distinct from the first component value (e.g., person) corresponding to the first index entry. In some embodiments, advancing, in the index, to a second index entry results in skipping one or more index entries between the first index entry and the second index entry that have the first component value (e.g., skipping the index entries shown in FIG. 5B between the index entries at either end of arrow 550-*a*).

In some embodiments, the empirically-determined schema is generated by traversing (736) only a predefined portion of the index. For example, if a client application is displaying a new contact form, it will use a schema for contacts, but does not necessarily need information about other portions of the schema and thus, in the example shown in FIG. 5B, an empirically-determined schema can be generated only for the portion of the index where Kind="person." In some embodiments, the predefined portion of the index to be traversed is determined (738) in accordance with a set of filters based on component values of the index entries. Continuing the example from above, the filter would be Kind="person" and thus the request received by Datastore Server 106 would be "provide a schema for entities where Kind=person."

Datastore Server 106 receives (740) a first request from an application. In some embodiments, the first request is schema dependent. In some embodiments, the application is running on Client 102 or App Server 106. In some embodiments, the first request is (742) a request for information about the empirically-determined schema. For example, the first request may be a request for the "current" schema of the database. As another example, the first request is a request for displaying a list of all, or a subset of, the valid Kinds and/or all in Entity Database 140 (or a subset of Entity Database 140 corresponding to the application or a namespace defined by the application). As another example, the first request is a request for displaying a list of all, or a subset of, the valid Properties within a respective valid Kind in the Entity Database 140 (or a subset of Entity Database 140 corresponding to the application or a namespace defined by the application). In some embodiments, the first request is (744) a request for information about entities in the schemaless database that is based on a version of the empirically-determined schema provided to the application. For example, the application was previously provided with an empirically-determined schema indicating that indicates that the entity database includes entities with Kind="person," and the application provides a subsequent request for a list of entities with Kind="person."

In some embodiments, after receiving the first request, Datastore Server 106 (or Schema Generator 125) generates (746) an empirically-determined schema, as described in greater detail above with reference to operations 716-738. In response to receiving the first request, Datastore Server 106 accesses (748) the empirically-determined schema (e.g., an empirically-determined schema generated prior to receiving the first request as described above with reference to operations 716-738 or an empirically-determined schema generated after receiving the first request).

After accessing the empirically-determined schema, Datastore Server 106 generates (750) a first response based on the empirically-determined schema and sends (752) the first response to the application (e.g., a client application at Client 102 or a backend application that services client application at App Server 104). For example, Datastore Server 106 provides the requesting application with information corresponding to at least a portion of the schema. In some embodiments, this provided schema is used for subsequent requests. Thus requesting application that receives the empirically-determined schema does not necessarily query the schema prior to transmitting the request, rather the application just assumes that a prior version of the schema is still valid and implements some fault management processes to handle situations where the prior version of the schema is no longer valid when a subsequent request relying on the prior version of the schema fails. In some situations, an application assumes that the schema rarely changes and thus requests the schema in accordance with predefined criteria, such as at the occurrence of predefined events (e.g., at startup) or at predefined intervals (e.g., once per day or once per week).

In some embodiments, the first request is a request to export the entities in the schemaless database to a respective schema-based database that requires a schema and the first response enables the entities in the schemaless database to be exported to the respective schema-based database in accordance with the empirically-determined schema. For example, relational databases require a predefined schema for imported data. Thus, in this example, prior to exporting the data from the schemaless database to a relational database, the empirically-determined schema is generated and provided to the relational database for use as the predefined schema in the relational database, and the data is imported to the relational database in accordance with the predefined schema (that was based on the empirically-determined schema).

In some embodiments, after generating the first response, Datastore Server 106 performs (754) one or more updates to the schemaless database. In some embodiments, updates to the schemaless database include one or more of: adding a new entity, deleting an entity, modifying an entity. These updates are typically performed in response to a request from a user or computer system to modify data corresponding to an application. In some implementations, following the updates to the schemaless database, Datastore Server 106 updates (756) the index in accordance with the updates to the schemaless database. For example, if a new entity is added to Entity Database 140 in FIG. 5A that has Kind=person, Age="29," Birthday="Jul. 18, 1982," Name="John," and Eye Color="Brown" four new index entries would be added to Index 142 in FIG. 5B in the index portion corresponding to Kind=Person, one for each of the properties in the new entity. In some embodiments, updating the index includes adding to or modifying the schema (e.g., adding a valid kind or property to the database). Continuing the example from above, a new valid property of Kind="person" would be added to the schema, Property="Eye Color," as the new entity has added a new valid property to the properties that are available.

After updating the index, Datastore Server 106 receives (758) a second request from the application. In some embodiments, the second request is received from a different application (e.g., an application other than the application from which the first request was received). In response to the second request, Datastore Server 106 generates (760) an updated empirically-determined schema at least in part based on a traversal of the index in accordance with the sort order. In other words, the application can modify the metadata schema simply by adding/modifying entities in the database in a way that modifies the schema, because modifying the database results in modifications to an index of the database and the index is used to generate the empirically-determined schema. As another example, in Index 142 of FIG. 5B, inserting an entity having Kind="person" and Property="Employed" with property value="True" would modify the schema to result in the modified schema with a new valid Property (e.g., "Employed") for Kind="person," with valid values that include Boolean values (e.g., "true" and "false," or "true," "false" and "unknown"). Similarly, in Index 142 of FIG. 5B, inserting an entity having Kind="person" and Property="Employed" with property value="False" would also modify the schema to result in the modified schema shown in FIG. 5C for Kind="person" with a new valid Property (e.g., "employed") with valid values that include Boolean values.

After generating the updated empirically-determined schema, Datastore Server 106 accesses (762) the updated empirically-determined schema and generates (764) a second response based on the updated empirically-determined schema. For example, if the request is for a schema for entities with Kind="person" the request would include a list of valid properties for Kind="person" (e.g., "eye color" and/or "employed"). After generating the second response, Datastore Server 106 sends (766) the second response to the application. In other words, the first response (e.g., a list of properties for entities with Kind="person" that include "age," "name" and "birthday") is based on an earlier version of the empirically-determined schema and the second response (e.g., a list of properties for entities with Kind="person" that include "age," "name," "birthday," "employed," and "eye color") is based on the updated version of the empirically-determined schema. Thus, if the first and second requests are both for information to enable a client application to display a new contact form, after receiving the response for the first request Client 102 would display a new contact form including three fields (e.g., age, name and birthday), while after receiving the second request Client 102 would display a new contact form including five fields (e.g., age, name, birthday, employed, and eye color). Additionally, it should be understood that, in some embodiments, particular kinds or properties or values could be removed from the empirically-determined schema in a similar manner by removing all entities from Entity Database 140 that include the particular kind or property or value from Entity Database 140, as the change would be propagated when Index 142 is updated and be reflected in a subsequently generated empirically-determined schema generated based on the updated index.

It should be understood that the particular order in which the operations in FIGS. 7A-7D have been described is merely an examples and is not intended to indicate that the described order is the only order in which the operations could be performed. One of ordinary skill in the art would recognize various ways to reorder the operations described herein. Additionally, it should be noted that details of other processes described herein with respect to method 600 (described herein with reference to FIG. 6) are also applicable in an analogous manner to method 700 described above with respect to FIGS. 7A-7D. For example, the entities, index(es), requests, responses and empirically-determined schema described above with reference to method 700 may have one or more of the characteristics of the various entities, index(es), requests, responses and empirically-determined schema described herein with reference to method 600. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a respective server system having one or more processors and memory storing one or more programs that when executed by the one or more processors cause the respective server system to perform the method, the method comprising:
storing a plurality of entities in a schemaless database wherein the entities are not structured in accordance with a predefined schema;
generating an index of the schemaless database for the plurality of entities stored in the schemaless database, wherein the index of the schemaless database has a plurality of index entries sorted in a sort order;
receiving a first request from an application; and
in response to the first request:
accessing an empirically-determined schema for the schemaless database, wherein the empirically-determined schema is generated from the index of the schemaless database;
generating a first response based on the empirically-determined schema; and
sending the first response to the application.

2. The method of claim 1, wherein the empirically-determined schema is generated prior to receiving the first request.

3. The method of claim 1, wherein the empirically-determined schema is generated in response to receiving the first request.

4. The method of claim 1, further comprising:
after generating the first response:
performing one or more updates to the schemaless database;
updating the index in accordance with the updates to the schemaless database;
after updating the index, receiving a second request from the application;
in response to the second request:
generating an updated empirically-determined schema at least in part based on a traversal of the index in accordance with the sort order;
accessing the updated empirically-determined schema;
generating a second response based on the updated empirically-determined schema; and
sending the second response to the application.

5. The method of claim 1, wherein generating the empirically-determined schema comprises traversing at least a portion of the index in accordance with the sort order, the traversing including skipping one or more index entries in the index.

6. The method of claim 5, wherein:
each of the entities includes one or more component values; and
skipping the one or more index entries includes skipping a plurality of consecutive index entries that share a common component value.

7. The method of claim 6, wherein traversing the index includes, for component values of a respective component type:
identifying, in the index, a first index entry having a first component value of the respective component type;
storing the first component value as a valid component value for the respective component type;
advancing, in the index, to a second index entry in accordance with a determination that second index entry has a second component value that is sequentially adjacent to the first component value in the sort order; and
storing the second component value as a valid component value for the respective component type.

8. The method of claim 1, wherein:
respective entities of the plurality of entities includes one or more component values;
each of the respective entities corresponds to one or more index entries; and
index entries in the index are sorted in accordance with component values so that index entries sharing a common component value have consecutive positions in the index.

9. The method of claim 1, wherein:
respective entities of the plurality of entities includes one or more component values;
respective component values of the one or more component values each include a component type; and
the empirically-determined schema includes, for a respective component type, a set of valid component values that correspond to the respective component type.

10. The method of claim 9, wherein the component values have component types selected from the set consisting of: kind, property and value.

11. The method of claim 1, wherein the empirically-determined schema is generated by traversing only a predefined portion of the index.

12. The method of claim 11, wherein the predefined portion of the index to be traversed is determined in accordance with a set of filters based on component values of the index entries.

13. The method of claim 1, wherein the first request is a request for information about the empirically-determined schema.

14. The method of claim 1, wherein the first request is a request for information about entities in the schemaless database that is based on a version of the empirically-determined schema provided to the application.

15. The method of claim 1, wherein:
the first request is a request to export the entities in the schemaless database to a respective schema-based database that requires a schema; and
the first response enables the entities in the schemaless database to be exported to the respective schema-based database in accordance with the empirically-determined schema.

16. A server system, comprising:
one or more processors;
memory; and
one or more programs, wherein the one or more programs are stored in the memory and configured to be executed by the one or more processors, the one or more programs including instructions for:
  storing a plurality of entities in a schemaless database wherein the entities are not structured in accordance with a predefined schema;
  generating an index of the schemaless database for the plurality of entities stored in the schemaless database, wherein the index of the schemaless database has a plurality of index entries sorted in a sort order;
  receiving a first request from an application; and
  in response to the first request:
    accessing an empirically-determined schema for the schemaless database, wherein the empirically-determined schema is generated from the index of the schemaless database;
    generating a first response based on the empirically-determined schema; and
    sending the first response to the application.

17. The system of claim 16, wherein the one or more programs further comprise instructions for:
after generating the first response:
  performing one or more updates to the schemaless database;
  updating the index in accordance with the updates to the schemaless database;
after updating the index, receiving a second request from the application;
in response to the second request:
  generating an updated empirically-determined schema at least in part based on a traversal of the index in accordance with the sort order;
  accessing the updated empirically-determined schema;
  generating a second response based on the updated empirically-determined schema; and
  sending the second response to the application.

18. The system of claim 16, wherein generating the empirically-determined schema comprises traversing at least a portion of the index in accordance with the sort order, the traversing including skipping one or more index entries in the index.

19. The system of claim 18, wherein:
each of the entities includes one or more component values; and
skipping the one or more index entries includes skipping a plurality of consecutive index entries that share a common component value.

20. The system of claim 19, wherein traversing the index includes, for component values of a respective component type:
identifying, in the index, a first index entry having a first component value of the respective component type;
storing the first component value as a valid component value for the respective component type;
advancing, in the index, to a second index entry in accordance with a determination that second index entry has a second component value that is sequentially adjacent to the first component value in the sort order; and
storing the second component value as a valid component value for the respective component type.

21. The system of claim 16, wherein the empirically-determined schema is generated by traversing only a predefined portion of the index.

22. The system of claim 16, wherein:
the first request is a request to export the entities in the schemaless database to a respective schema-based database that requires a schema; and
the first response enables the entities in the schemaless database to be exported to the respective schema-based database in accordance with the empirically-determined schema.

23. A non-transitory computer readable storage medium storing one or more programs, the one or more programs comprising instructions, which when executed by a computer system with one or more processors, cause the computer system to:
store a plurality of entities in a schemaless database wherein the entities are not structured in accordance with a predefined schema;
generate an index of the schemaless database for the plurality of entities stored in the schemaless database, wherein the index of the schemaless database has a plurality of index entries sorted in a sort order;
receive a first request from an application; and
in response to the first request:
  access an empirically-determined schema for the schemaless database, wherein the empirically-determined schema is generated from the index of the schemaless database;
  generate a first response based on the empirically-determined schema; and
  send the first response to the application.

24. The non-transitory computer readable storage medium of claim 23, wherein the one or more programs further comprise instructions to:
after generating the first response:
  perform one or more updates to the schemaless database;
  update the index in accordance with the updates to the schemaless database;
after updating the index, receive a second request from the application;
in response to the second request:
  generate an updated empirically-determined schema at least in part based on a traversal of the index in accordance with the sort order;
  access the updated empirically-determined schema;
  generate a second response based on the updated empirically-determined schema; and
  send the second response to the application.

25. The non-transitory computer readable storage medium of claim 23, wherein generating the empirically-determined schema comprises traversing at least a portion of the index in accordance with the sort order, the traversing including skipping one or more index entries in the index.

26. The non-transitory computer readable storage medium of claim 25, wherein:
each of the entities includes one or more component values; and
skipping the one or more index entries includes skipping a plurality of consecutive index entries that share a common component value.

27. The non-transitory computer readable storage medium of claim 26, wherein traversing the index includes, for component values of a respective component type:
identifying, in the index, a first index entry having a first component value of the respective component type;
storing the first component value as a valid component value for the respective component type;

advancing, in the index, to a second index entry in accordance with a determination that second index entry has a second component value that is sequentially adjacent to the first component value in the sort order; and storing the second component value as a valid component value for the respective component type.

28. The non-transitory computer readable storage medium of claim 23, wherein the empirically-determined schema is generated by traversing only a predefined portion of the index.

29. The non-transitory computer readable storage medium of claim 23, wherein:

the first request is a request to export the entities in the schemaless database to a respective schema-based database that requires a schema; and the first response enables the entities in the schemaless database to be exported to the respective schema-based database in accordance with the empirically-determined schema.

* * * * *